(12) United States Patent  
Chong et al.

(10) Patent No.: US 8,498,473 B2  
(45) Date of Patent: Jul. 30, 2013

(54) SYSTEM FOR COMPUTATIONALLY QUANTIFYING SIMILARITIES BETWEEN IMAGES

(75) Inventors: Kenn Min Chong, Malden, MA (US); Yuliang Li, Beijing (CN)

(73) Assignee: Compuware Corporation, Detroit, MI (US)

( * ) Notice: Subject to any disclaimer, the term of this patent is extended or adjusted under 35 U.S.C. 154(b) by 499 days.

(21) Appl. No.: 12/862,634

(22) Filed: Aug. 24, 2010

(65) Prior Publication Data

US 2012/0051634 A1  Mar. 1, 2012

(51) Int. Cl.
*G06K 9/00* (2006.01)

(52) U.S. Cl.
USPC ............ 382/162; 382/209; 715/234; 715/205

(58) Field of Classification Search
None
See application file for complete search history.

(56) References Cited

U.S. PATENT DOCUMENTS

| | | | | |
|---|---|---|---|---|
| 5,893,095 | A * | 4/1999 | Jain et al. ............................. | 1/1 |
| 6,163,622 | A * | 12/2000 | Abdel-Mottaleb et al. ... | 382/170 |
| 6,351,556 | B1 * | 2/2002 | Loui et al. ..................... | 382/164 |
| 6,404,925 | B1 * | 6/2002 | Foote et al. ................... | 382/224 |
| 6,463,426 | B1 * | 10/2002 | Lipson et al. ........................ | 1/1 |
| 6,782,395 | B2 * | 8/2004 | Labelle .................................. | 1/1 |
| 7,917,618 | B1 * | 3/2011 | Bettis et al. ................... | 709/224 |
| 8,290,918 | B1 * | 10/2012 | Ioffe .............................. | 707/698 |
| 8,381,094 | B1 * | 2/2013 | Prasad et al. .................. | 715/234 |
| 2004/0090453 | A1 * | 5/2004 | Jasinschi et al. .............. | 345/723 |
| 2005/0177597 | A1 * | 8/2005 | Elmer ........................ | 707/104.1 |
| 2006/0177131 | A1 * | 8/2006 | Porikli .......................... | 382/168 |
| 2006/0285172 | A1 * | 12/2006 | Hull et al. ..................... | 358/448 |
| 2007/0118528 | A1 * | 5/2007 | Choi et al. ......................... | 707/9 |
| 2008/0235103 | A1 * | 9/2008 | Baccas et al. .................. | 705/26 |
| 2009/0249216 | A1 * | 10/2009 | Charka et al. ................. | 715/744 |
| 2010/0211893 | A1 * | 8/2010 | Fanning et al. ................ | 715/760 |
| 2011/0078663 | A1 * | 3/2011 | Huang et al. .................. | 717/126 |
| 2011/0093773 | A1 * | 4/2011 | Yee ................................ | 715/235 |
| 2011/0173589 | A1 * | 7/2011 | Guttman et al. ............... | 717/125 |
| 2011/0191676 | A1 * | 8/2011 | Guttman et al. ............... | 715/716 |

OTHER PUBLICATIONS

Swain et al. (Nov. 1991) "Color indexing." Int'l J. Computer Vision, vol. 7 No. 1, pp. 11-32.*

* cited by examiner

*Primary Examiner* — Barry Drennan
(74) *Attorney, Agent, or Firm* — Fenwick & West LLP

(57) ABSTRACT

Systems and methods provide for quantifying the similarity between images that appear similar. Given a set of images, one image is selected as the base image, to which the remaining images are compared. One or more portions of the base image are selected for comparison and the color composition of these areas is calculated. Then, the color compositions are examined to quantify the similarity or difference between the images, which is assigned a score reflective of the quantitative similarity or difference. The results are displayed. These systems and methods allow, e.g, a website owner to check whether web pages have come through imperfectly across different browsers; the analysis identifies not just blatant errors, but even single-pixel shifts.

29 Claims, 11 Drawing Sheets

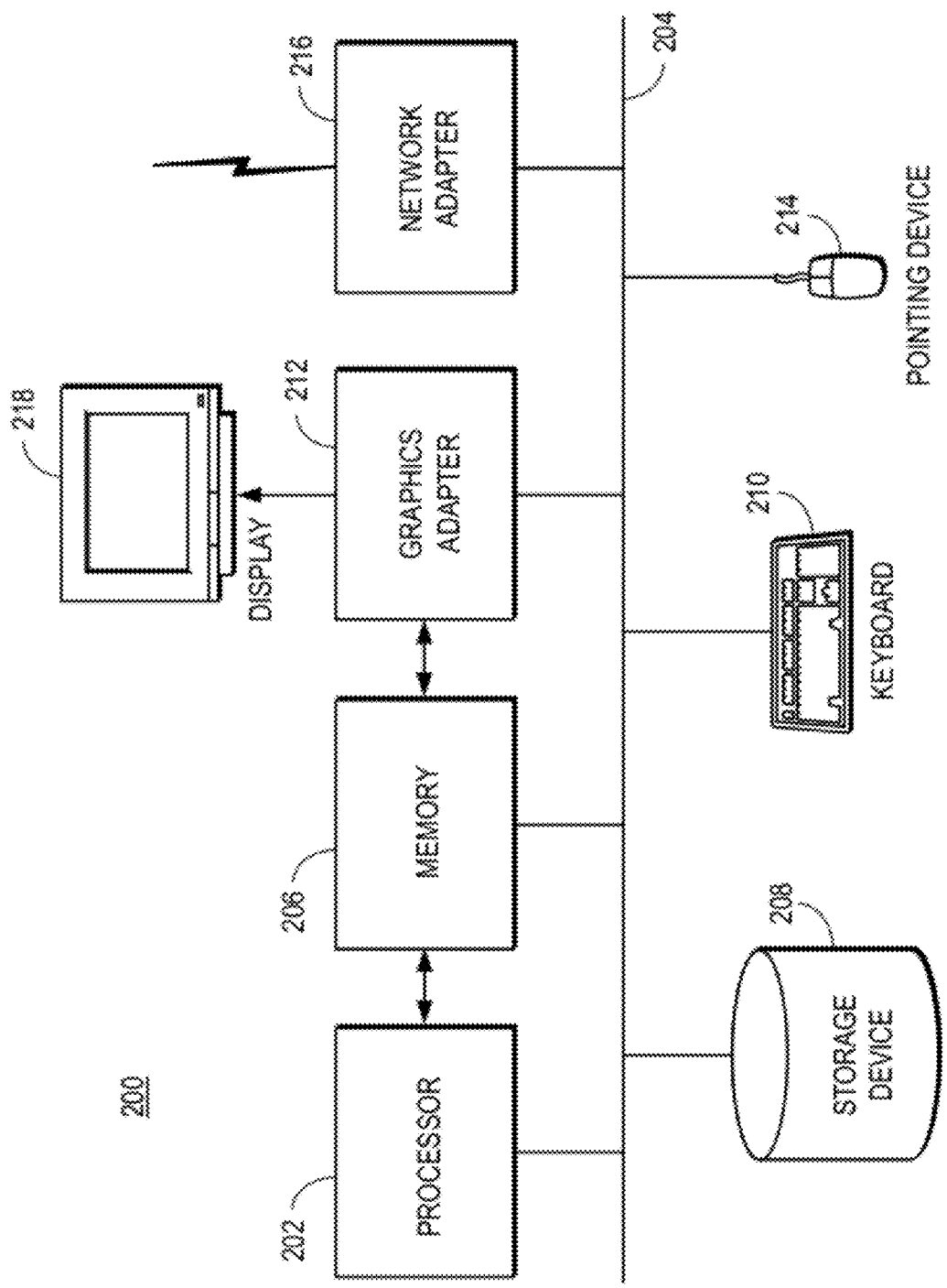

SYSTEM FOR COMPUTATIONALLY QUANTIFYING SIMILARITIES BETWEEN IMAGES

BACKGROUND

The present invention relates generally to the field of image processing, and more specifically to computationally quantifying similarities and/or differences between images.

Methods for manually comparing pairs of images are known in the art, such as by a human being visually making a comparison between images to determine the ways in which they are similar and different. However, human error leads to inaccuracies in such assessments, and for large collections of images, human-driven comparisons can be time consuming or impossible. Other known solutions for comparing images can identify that one image is different from the next, but do not provide a means for quantifying the degree of similarity or difference.

One area in which image analysis is used is when users, such as website owners, check web page integrity across multiple browsers. These tests can include comparison of thousands of images, for which comparison traditional analyses can be too protracted.

SUMMARY

In various embodiments, the present invention provides methods and systems for quantifying the similarity between images that appear similar. Given a set of images, one image is selected as the base image, to which the remaining images will be compared. One or more portions of the base image are selected for comparison and the color composition of these areas is calculated. Then, the color compositions are examined to determine the degree of similarity or difference between the images, which is assigned a score reflective of the quantitative difference. The results are displayed; the display can be modified to filter out results using a threshold similarity.

The methods described herein allow, e.g, a website owner to check whether web pages have come through imperfectly across different browsers; the analysis identifies not just blatant errors, but even single-pixel shifts.

The description in the specification is not all inclusive and, in particular, many additional features will be apparent to one of ordinary skill in the art in view of the drawings, specification, and claims. Moreover, it should be noted that the language used in the specification has been selected principally for readability and instructional purposes, but not to circumscribe the inventive subject matter.

BRIEF DESCRIPTION OF THE DRAWINGS

FIG. 2A is a high-level block diagram illustrating a typical computer for use in conjunction with the present invention.

One skilled in the art will readily recognize from the following discussion that alternative embodiments of the structures and methods illustrated herein may be employed without departing from the principles of the present invention.

DETAILED DESCRIPTION OF THE EMBODIMENTS

Figure 1:
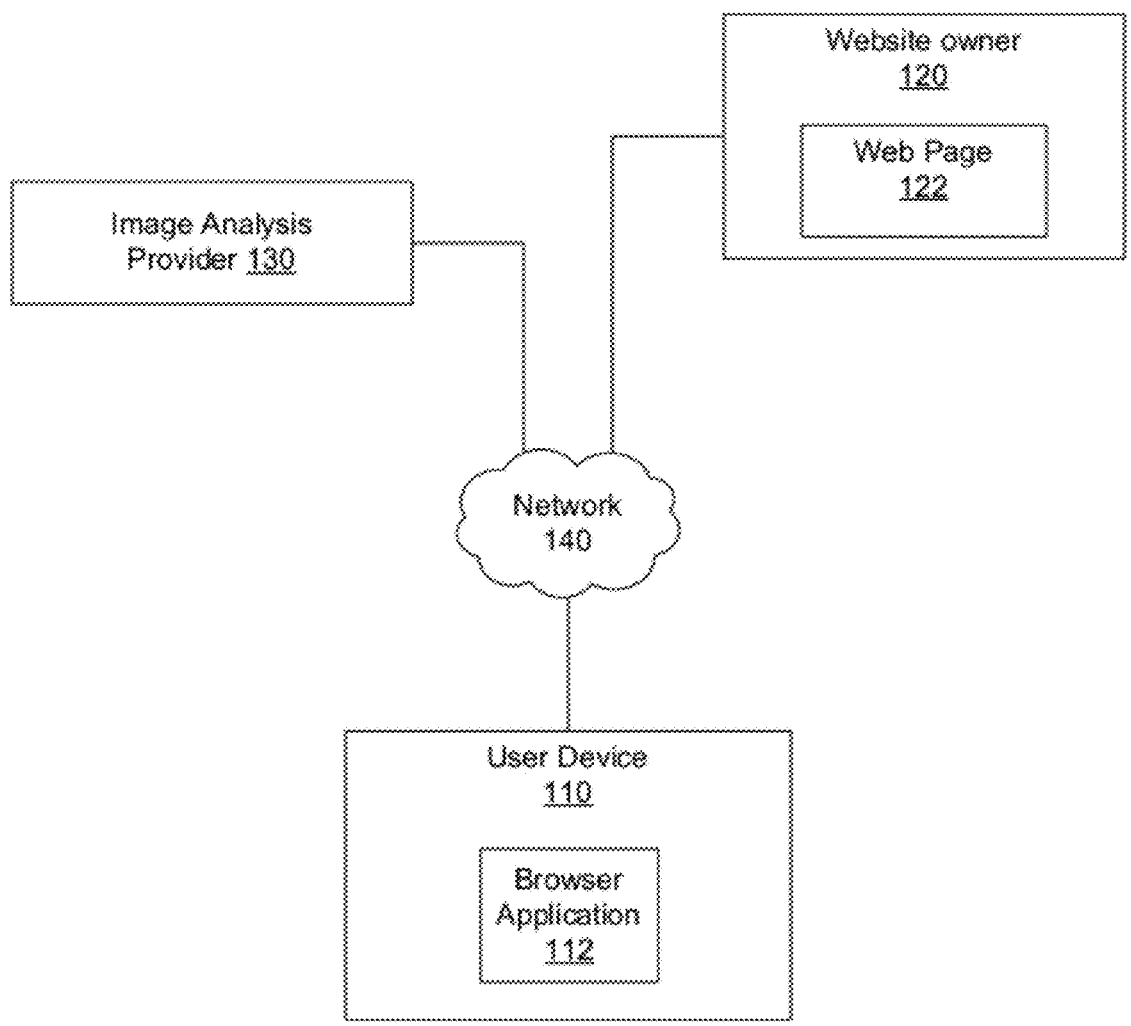
FIG. 1 illustrates a computing environment for one embodiment of a system for comparing similarity between images.

FIG. 1 illustrates the computing environment 100 for one embodiment of a system 130 for comparing similarity between images. The environment 100 includes user devices 110, website owners 120, an image analysis provider 130, and a network 140. For purposes of illustration, the embodiment of the system 100 shown by FIG. 1 includes a single website owner 120 and a single user device 110. However, in other embodiments, the system 100 may include more user devices 110 and/or more website owners 120.

The user devices 110 comprise computing devices that can receive input from a user and can transmit and receive data via the network 140. For example, user devices 110 may be a desktop computer, a laptop computer, a smart phone, a personal digital assistant (PDAs), or any other device including computing functionality and data communication capabilities. A user device 110 is configured to communicate with the website owner 120 and the image analysis provider 130 via the network 140.

The user device 110 includes a browser application 112, which may be any commercially available web browser, e.g., Internet Explorer, Mozilla Firefox, Safari, Opera, or Google Chrome. In one embodiment, the user device 110 displays content by processing a markup language document, e.g., associated with a web page 122 provided by web site owner 120, using a browser application 112. By executing the instructions included in the markup language document, the browser application 112 displays the web page 122 using the format or presentation described by the markup language document.

The website owner 120 comprises one or more web servers including one or more web pages 122, which are communicated to the user device 110 using the network 140. A web page 122 provided by the website owner 120 comprises a markup language document identifying content and including instructions specifying formatting or presentation of the identified content, as described above.

The image analysis provider 130 comprises one or more computing devices facilitating the methods described herein. The image analysis provider 130 compares a set of images, e.g., of web pages 122 rendered by different browsers 112, to a base image to quickly determine the similarity between the images, and display similarity information to a user, such as the website owner 120. The image analysis provider 130 provides the core functionality described herein, and is further described in conjunction with FIGS. 2A and 2B.

The network 140 may comprise any combination of local area and/or wide area networks, the Internet, or one or more intranets, using both wired and wireless communication systems.

FIG. 2A is a high-level block diagram illustrating a typical computer 200 for use in conjunction with the present invention, e.g., as the image analysis provider 130, website owner 120, and/or user devices 110. Illustrated are a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor. The storage device 208 is, in one embodiment, a hard disk drive but can also be any other device capable of storing data, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer 200. The graphics adapter 212 displays images and other information on the display 218. The network adapter 216 couples the computer 200 to the network 114.

The types of computers 200 utilized by the entities of FIG. 1 can vary depending upon the embodiment and the processing power utilized by the entity. For example, a user 110 that is a mobile device such as a PDA typically has limited processing power, a small display 218, and might lack a pointing device 214. The website owner 120, in contrast, may comprise multiple blade servers working together.

Figure 2B:
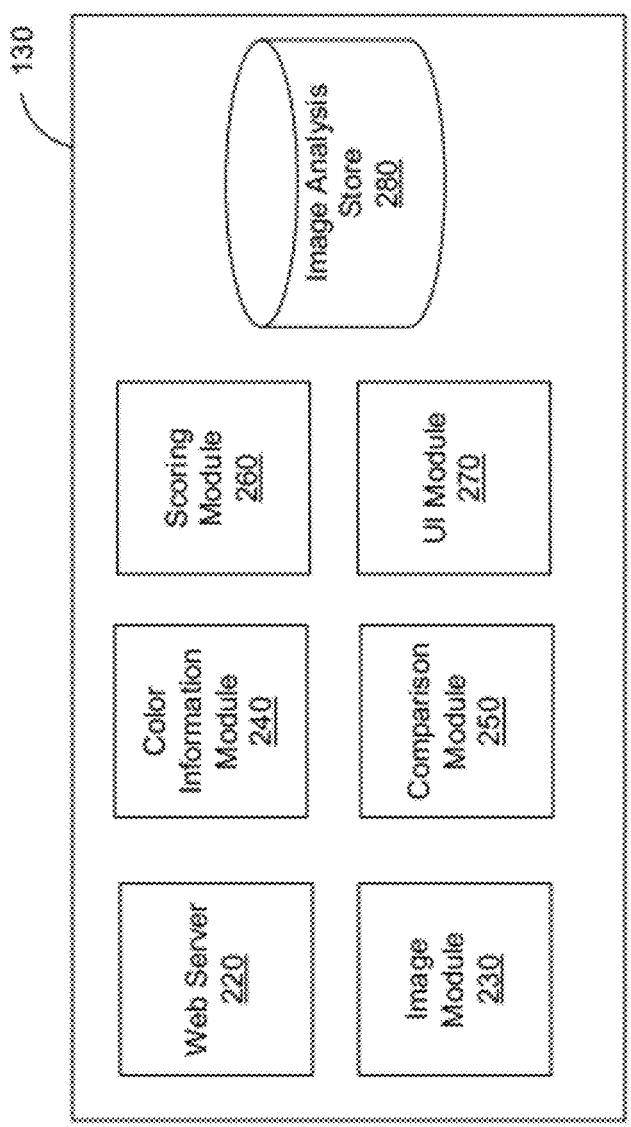
FIG. 2B is a block diagram of one embodiment of an image analysis provider.

As is known in the art, the computer 200 is adapted to execute computer program modules, as described in conjunction with FIG. 2B. The modules are stored on the storage device 208, loaded into the memory 206, and executed by the processor 202.

FIG. 2B is a block diagram of one embodiment of an image analysis provider 130. The embodiment of the image analysis provider 130 shown in FIG. 2B is a computer system that includes a web server 220, an image module 230, a color information module 240, a comparison module 250, a scoring module 260, a user interface 270, and an image analysis store 280.

The web server 220 links the image analysis provider 130 to the end user devices 110 and website owners 120 via network 140, and is one means for so doing. The web server 220 serves and captures web pages, as well as other web related content, such as Java, Flash, XML, and so forth.

The image module 230 receives images and prepares them for analysis, and is one means for so doing. The image module 230 receives images, e.g., via web server 220, and provides information necessary to render them for display. The image module 230 receives selection of base images and portions thereof for the analysis, and designates other images in the same comparison as analysis images.

Portion selection can be of an entire image, selected portions within the image, or a single portion of the image with sections excluded, according to various embodiments described herein. Selection of a portion of the image, e.g., in the case of a web page capture, is useful because many web pages have dynamic content that consistently varies. However, in some applications grabbing the entire page, or excluding certain sections from the whole, is more useful to the analysis than selecting isolated portions for comparison. For example, because of differences in headers corresponding to different browser types, it is useful to exclude the header from the portion(s) selected for analysis to prevent artificially bringing down the similarity score for portions of the image known to be disparate across different browsers, rather than as a result of any error.

In some embodiments in which the analysis need not be very precise, a rough JPEG of page portions could be used. However, in embodiments that require more precise detail, any compression used should be accounted for when grabbing pages for analysis to prevent falsely lowering the similarity score for those pages.

The color information module 240 determines color information from the selected portions of base images and the corresponding portions in analysis images, and is one means for so doing. The color information module 240 quantifies each color in the selected portions, e.g., by determining a number of pixels of each color in the image.

The comparison module 250 compares the color information between the base image and the analysis images, and is one means for so doing. In one example, the number of pixels of each color in each portion of the base image is compared to the number of pixels of the same color in the corresponding portions of each analysis image, and the similarity between the images is recorded. In a different example, the same numbers of pixels are measured, but from them the difference between the images is recorded. In yet another example, a hash function first is used to see whether the base and analysis images are identical, and only if they are not does a pixel level analysis proceed.

The scoring module 260 converts color information between images into scores, and is one means for so doing. In one example, a color score is determined for each color in a portion, and then the individual colors are added together to yield a portion score. The portion scores for each portion then are added to yield a combined portion score. To determine a similarity score for the analysis image, the combined portion score is divided by the total number of pixels in the combined portions, and the result is multiplied by 100. This similarity score is assigned to the associated analysis image, and ranges from 0 (not similar) to 100 (identical). If a two-step hash-based process is used, images determined to be identical are assigned the highest similarity score (i.e., 100). If there is only one portion, e.g., a whole with sections excluded, the portion score is the same as the combined portion score, which is divided by the number of pixels in the portion, and then multiplied by 100.

The user interface module 270 displays the base and analysis images and results of the comparisons between them, and is one means for so doing. The user interface module 270 provides the user interfaces described in conjunction with FIGS. 5A-6. The user interface module 270 provides for display of a number of images, designation of an image as the base image, selection of portion(s) of the base image for comparison, analysis progress information, analysis results, a slider for adjusting the displayed analysis images, and various display areas within the user interface.

The image analysis store 280 may be a relational database or any other type of database that stores the data used by the methods described herein; it stores various data produced during the image comparison process, and is one means for so doing. For example, one or more tables are stored that include image information, portion information, comparison information, and score information.

The modules 220-270 are responsible for orchestrating the processes performed according to the methods of the present invention, however the modules need not be discrete modules; the configuration shown is meant only by way of example and other configurations are within the scope of the present invention.

This system may be implemented using a single computer, or a network of computers, including cloud-based computer implementations. The computers are preferably server class computers including one or more high-performance CPUs, a main memory, as well as computer readable, persistent storage, and running an operating system such as LINUX or variants thereof. The operations of the system 130 as described can be controlled through either hardware or through computer programs installed in computer storage and executed by the processors of such servers to perform the functions described herein. The system 130 includes other hardware elements necessary for the operations described here, including network interfaces and protocols, security systems, input devices for data entry, and output devices for display, printing, or other presentations of data; these and other conventional components are not shown so as to not obscure the relevant details.

As noted above, system 130 comprises a number of "modules," which refers to computational logic for providing the specified functionality. An engine can be implemented in hardware, firmware, and/or software. A module may sometimes be equivalently referred to as an "engine" or a "server." It will be understood that the named components represent one embodiment of the present invention, and other embodiments may include other components. In addition, other embodiments may lack the components described herein and/or distribute the described functionality among the components in a different manner. Additionally, the functionalities attributed to more than one component can be incorporated into a single component. Where the engines described herein are implemented as software, the engine can be implemented as a standalone program, but can also be implemented through other means, for example as part of a larger program, as a plurality of separate programs, or as one or more statically or dynamically linked libraries. In any of these software implementations, the engines are stored on the computer readable persistent storage devices of the system 130, loaded into memory, and executed by the one or more processors of the system's computers.

Figure 3:
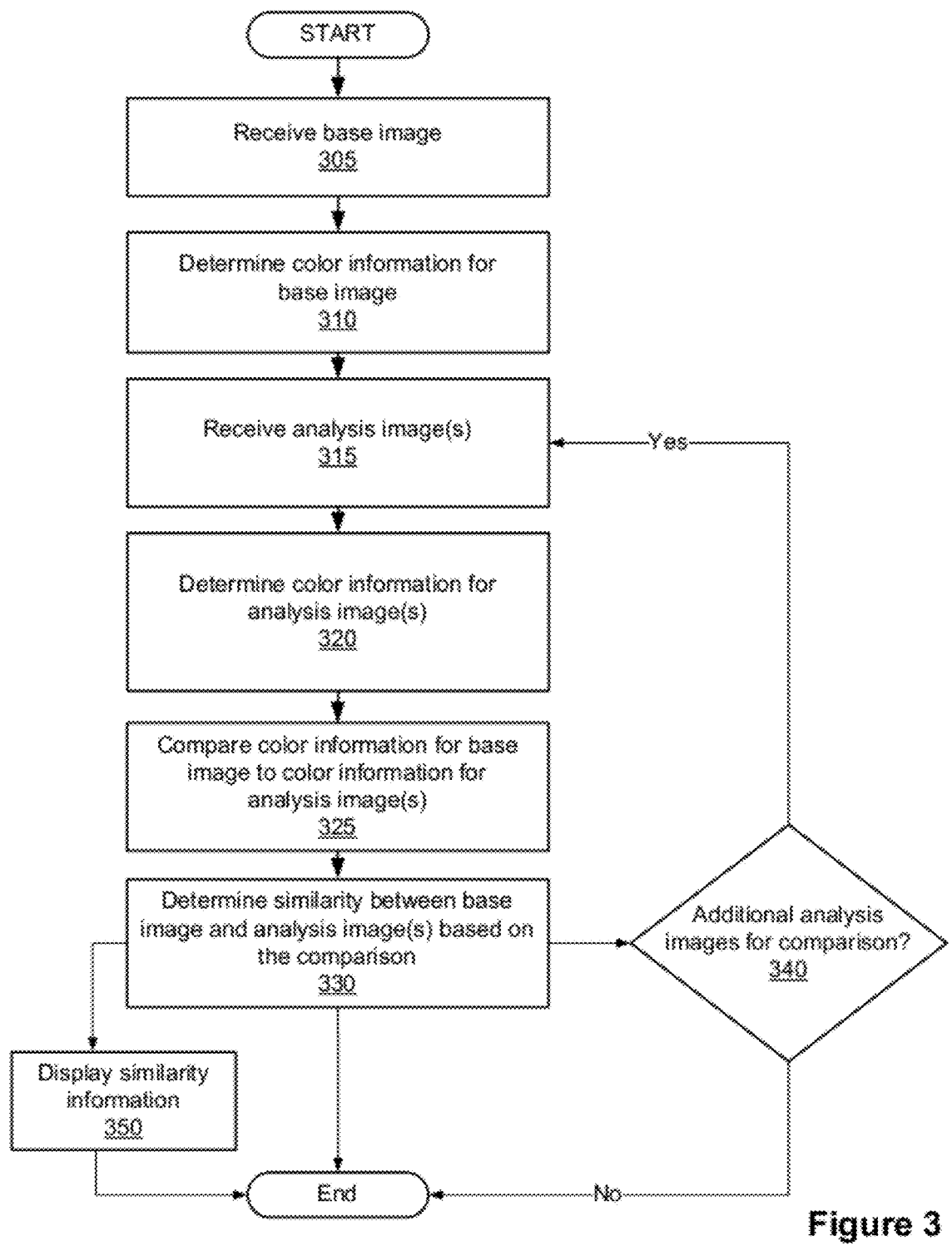
FIG. 3 is a flowchart showing one embodiment of a process for comparing similarity between images.

FIG. 3 is a flowchart showing one embodiment of a process for comparing similarity between images. The methods described herein allow, e.g., a website owner to check whether web pages have come through imperfectly across different browsers; the analysis identifies not just blatant errors, but even single-pixel shifts.

The process begins by the system receiving 305 selection of a base image, and at least one portion of the base image. The base image is the image that will be used as the basis for image comparison to a set of analysis images, and the portion is the area of the image that will be compared. In one embodiment, portions are selected directly by drawing rectangles over the image. In another embodiment, the portion is an entire image (e.g., a web page), excluding certain sections of the image (e.g., dynamic content on a web page); in this example, the portion is selected indirectly by rectangles drawn over the image for sections to exclude from the portion. The portion(s) take other shapes and sizes according to other embodiments; rectangles are used here and in the figures for simplicity of description. For example, according to one embodiment, the portion(s) are selected by providing coordinates corresponding to the boundaries of a selection area (for inclusion or exclusion). According to another embodiment the base image is a web page and the portion is the entire web page. This list is meant to be exemplary but not exclusive. Sections of the image selected for the portions may be determined based on the importance of the content of the portion. For example, a company logo may be a section that the web page provider wants to make sure always is displayed without errors. Similarly, sections excluded typically are based on the content of those sections, e.g., sections with dynamic content are likely to be excluded.

Next the system determines 310 color information from the portion(s) of the base image, e.g., by quantifying each color in the selected portion(s) of the base image. The determination 310 includes determining a number of pixels of each color, for each selected portion, in one iteration.

Figure 4:
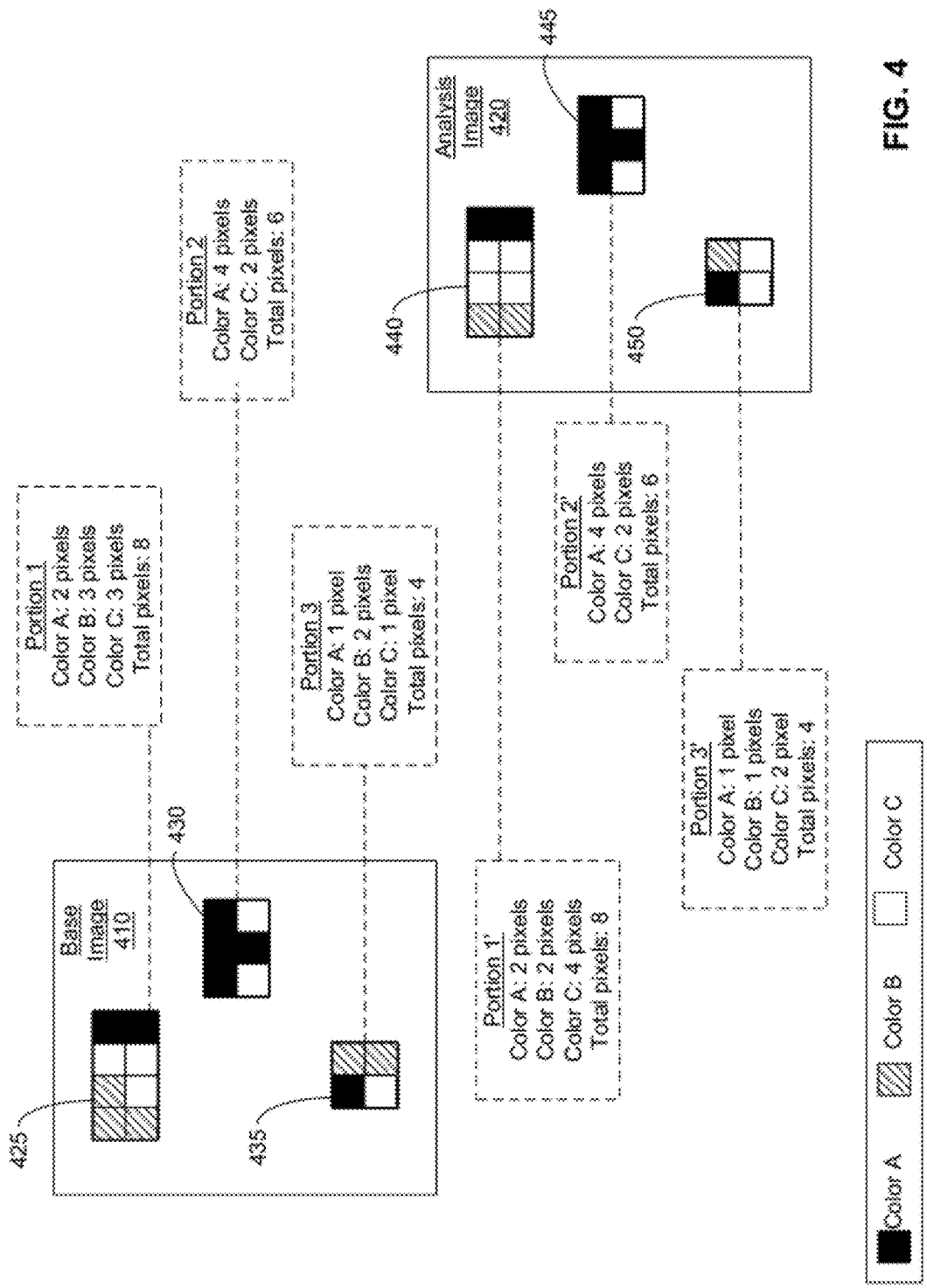
FIG. 4 is a conceptual diagram depicting one embodiment of the process of FIG. 3.

Referring briefly to FIG. 4, it shows a conceptual diagram with a simplistic example of the process of FIG. 3. In base image 410, three portions 425, 430, 435 are selected. In this example three colors are shown, represented by black squares (Color A), hashed squares (Color B), and white squares (Color C). As shown in the call out box, Portion 1 425 is an eight-pixel portion, and includes two (2) pixels of Color A, three (3) pixels of Color B, and three (3) pixels of Color C. Similarly, Portion 2 430 is a six-pixel portion, including four (4) pixels of Color A and two (2) pixels of Color C (no pixels of Color B); Portion 3 435 is a four-pixel portion, including one (1) pixel of Color A, two (2) pixels of Color B, and one (1) pixel of Color C.

With continued reference to FIG. 3, the system then receives 315 at least one analysis image for comparison to the base image. In one example, the base image and the analysis image(s) correspond to web pages rendered by different devices and/or browsers. Typically, multiple images are received for comparison to the base image. From the analysis images, portions are identified that correspond to the selected portion(s) of the base image.

The system then determines 320 color information from the analysis image(s), e.g., using the process described above. Again each color in the selected portion(s) of the base image is quantified in one iteration, for example by determining a number of pixels of each color, for each selected portion. Referring again to FIG. 4, analysis image 420 has three corresponding portions 440, 445, 450. Portion 1' 440 is an eight-pixel portion corresponding to Portion 1 425, and includes two (2) pixels of Color A, four (4) pixels of Color B, and two (2) pixels of Color C. Similarly, Portion 2' 445 is a six-pixel portion corresponding to Portion 2 430, including four (4) pixels of Color A and two (2) pixels of Color C (no pixels of Color B). Portion 3' 450 is a four-pixel portion corresponding to Portion 3 435, including one (1) pixel of Color A, one (1) pixel of Color B, and two (2) pixels of Color C.

The above steps 305-320 are not limited to the order described above. In an alternative embodiment, the base image and analysis images both are received 305, 315, portions are selected from the base image, and then color information is determined 310, 320 for each as a basis for the comparison step 325.

Referring again to FIG. 3, the system next compares 325 the color information between the base image and the analysis image(s). In one example, the quantified color (e.g., number of pixels) of each color in each portion of the base image is compared to the quantified colors in the corresponding portion(s) of each analysis image, and the similarity between the colors, e.g., and the number of pixels of a given color that are common between the base image and analysis image is noted. In a different example, a hash function is first used on the color quantity information from the base and analysis images to see if they match, and only if they do not does a more detailed, e.g., pixel level, determination of similarity occur.

Although the process of FIG. 3 is described in terms of similarity of the color information between the base image and the analysis image(s), the comparison alternatively could be made using the differences in the color information between the images. Similarly, the base image portion could alternatively include the entire image excluding selected sections according to another embodiment.

Referring to FIG. 4, the color information for each color in Portion 1 410 in the base image 410 is compared to Portion 1' 440 in the analysis image. The comparison information includes how many pixels are similar in this example, as shown in the table below.

TABLE 1

|  | Total units per portion | Color A similarity | Color B similarity | Color C similarity | Total per portion |
|---|---|---|---|---|---|
| Portion 1 | 8 | 2 | 2 | 3 | 7 |
| Portion 2 | 6 | 4 | 0 | 2 | 6 |
| Portion 3 | 4 | 1 | 1 | 1 | 3 |
| Image total | 18 |  |  |  | 16 |

E.g., for Portion 1 425 of the base image 410 and Portion 1' 440 of the analysis image 420, Color A has a similarity of two (2) pixels (each has two pixels of Color A), Color B has a similarity of two (2) pixels (Portion 1 425 has three pixels, but Portion 1' 440 only has two; the number of pixels of Color B common between them is two), and Color C has a similarity of three (3) pixels (Portion 1 425 has three pixels, Portion 1' has four pixels; the number of pixels of Color C common between them is three). Similar information is shown for Portions 2 and 3.

Referring again to FIG. 3, the system next determines 330 the similarity between the images based on the comparison 325. One example of this determination 330 uses the similarity values determined in step 325 as described with respect to FIG. 4. Continuing with the above example, for each analysis image, similarities for each color (color score) are determined, and then added together to yield a portion score (see total per portion column in Table 1). The portion scores for each portion are then added to yield a combined portion score (last row in total per portion column of Table 1). To determine a similarity score for the analysis image, the combined portion score is divided by the total number of pixels in the portions (image total row, units per portion column of Table 1), and the result is multiplied by 100. E.g., (16/18)*100=89. This score is assigned to the associated analysis image. Using this calculation, the similarity scores range from 0 (not similar) to 100 (identical).

Alternatively, a two-step process is used in which a hash first is taken of the color quantity information for base and analysis images as indicated above to determine if the images are identical. If they are identical, then a highest similarity score is assigned (e.g., 100). If they are not identical, then a similarity score can be determined, e.g., per the process described above.

In another alternative, the amount of difference between the images is measured, such that determining the similarity between images includes characterizing an image with the lowest difference score as the most similar.

The above process corresponds to the analysis of a single analysis image. However, as discussed herein, the analysis is applied to multiple analysis images in most cases. Thus, another step in the process includes determining 340 whether additional images require comparison, and if so, repeating the comparison for the additional image(s). The above-described process facilitates a quick comparison of many analysis images. The hash-based alternative would allow scaling to an even larger number of analysis images in a short time; only those images determined not to be identical would be put through the complete analysis process. If many analyses need to be processed by the system, new images submitted for analysis can be placed in a queue, e.g., that operates on the first-in, first-out basis.

Various of the data produced during the above process is stored. For example, one or more databases store one or more tables including information about each image (base, analysis), each portion size/shape/location, each individual comparison, each of the (intermediate or similarity) scores, and similar information.

The system also displays 350 the similarity information, e.g., in a user interface, as will be described in additional detail in conjunction with FIGS. 5A-6. In one example, the display includes the images for comparison, a function for selecting portions of the base image, an indication of the progress of the analysis process, a score for each analysis image, and a function for limiting the analysis images displayed by setting a threshold similarity score.

Figure 5A:
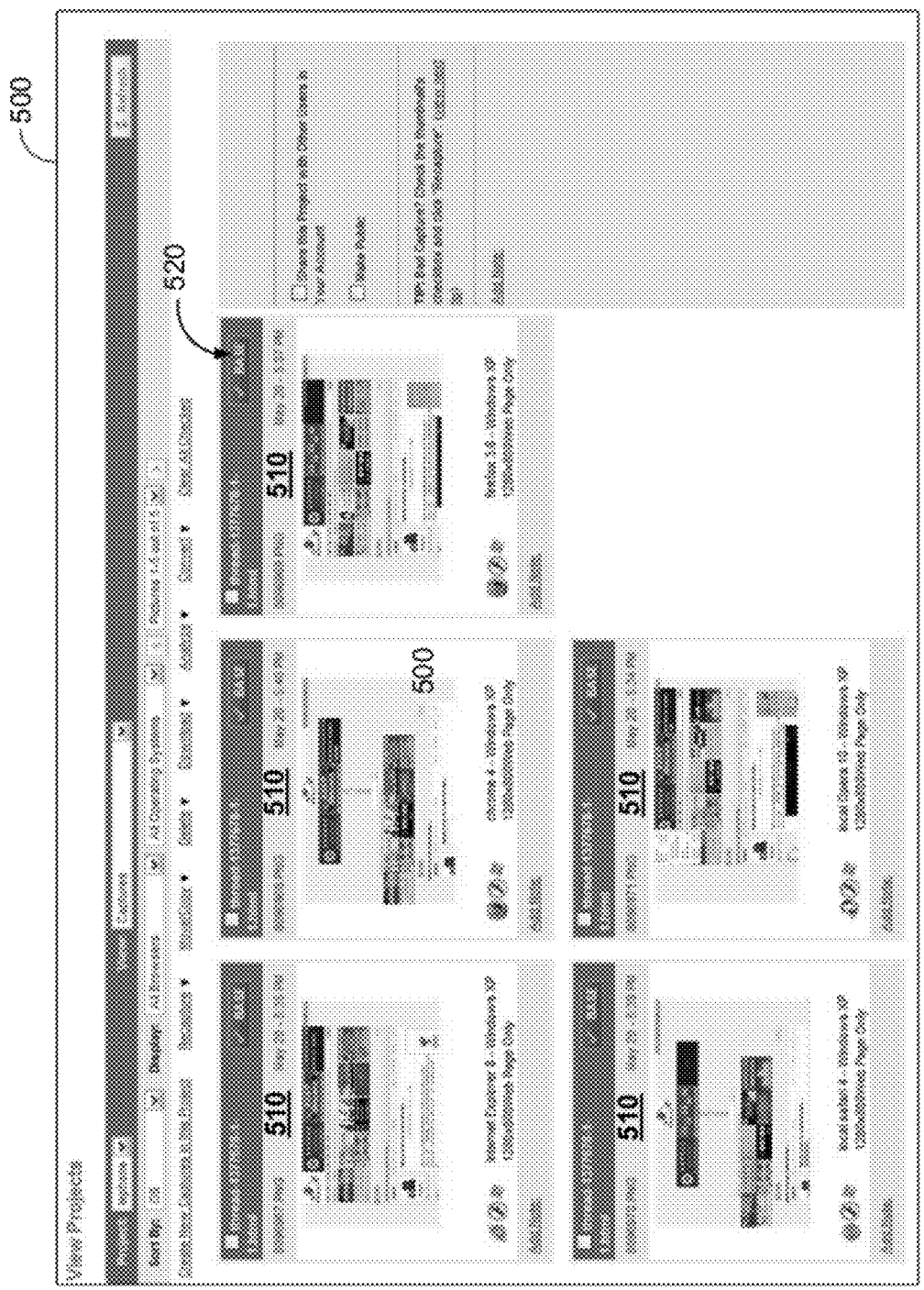
FIG. 5A depicts one embodiment of a user interface of an image comparison system.

FIG. 5A depicts one embodiment of a user interface 500 of an image comparison system. The user interface 500 includes a number of displayed images 510. The interface 500 includes a base selection button 520 for each image, which allows the image to be designated as the base image for the comparison. In one example the base selection button 520 is visually distinguished, e.g., by a change in color, once selected. The location of the base image is the base image display area. Upon selection, the remaining images are designated as the analysis images for comparison to the base image. In addition, the selection may trigger a portion selection window to display.

The location of the analysis images is the analysis image display area. The base and analysis display areas may (FIG. 5C) or may not (FIG. 5B) be separate, discrete display areas. As shown in the example of FIG. 5A, the different images correspond to a web page as rendered in different browser applications (e.g., Internet Explorer 8, Chrome 4, Firefox 3.6, Local Safari 4, and Local Opera 10), as indicated at the bottom of each image.

Figure 6:
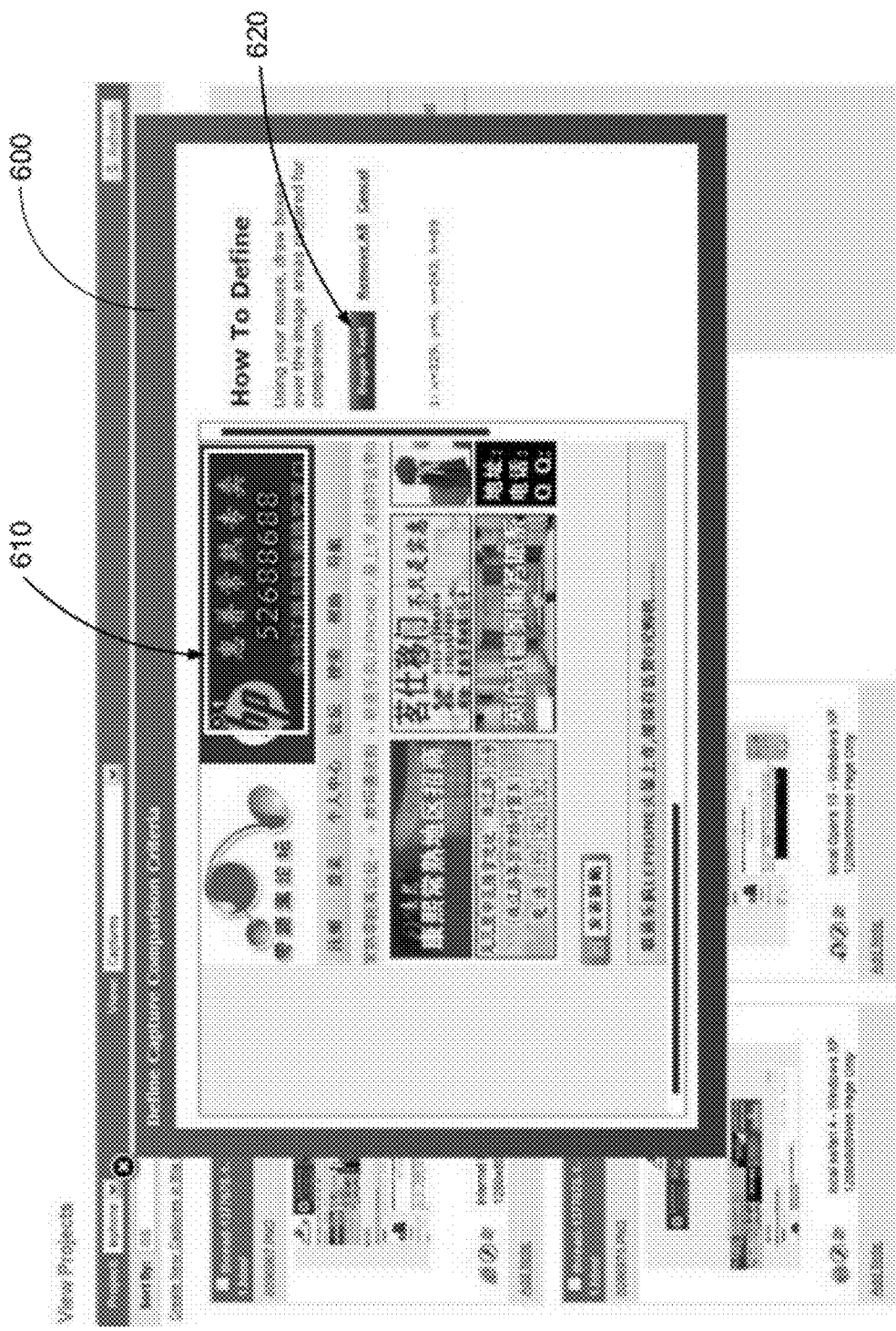
FIG. 6 depicts one embodiment of a portion selection window.

FIG. 6 depicts one embodiment of a portion selection window 600, e.g., in the form of a pop-up window. Window 600 includes functionality for selecting one or more portions 610 for comparison between the images according to the methods described herein. Portions include various sizes, shapes, and ways of selection. Once all portions are selected, a function (e.g., button 620) is included for initiating the comparison between images.

Figure 5B:
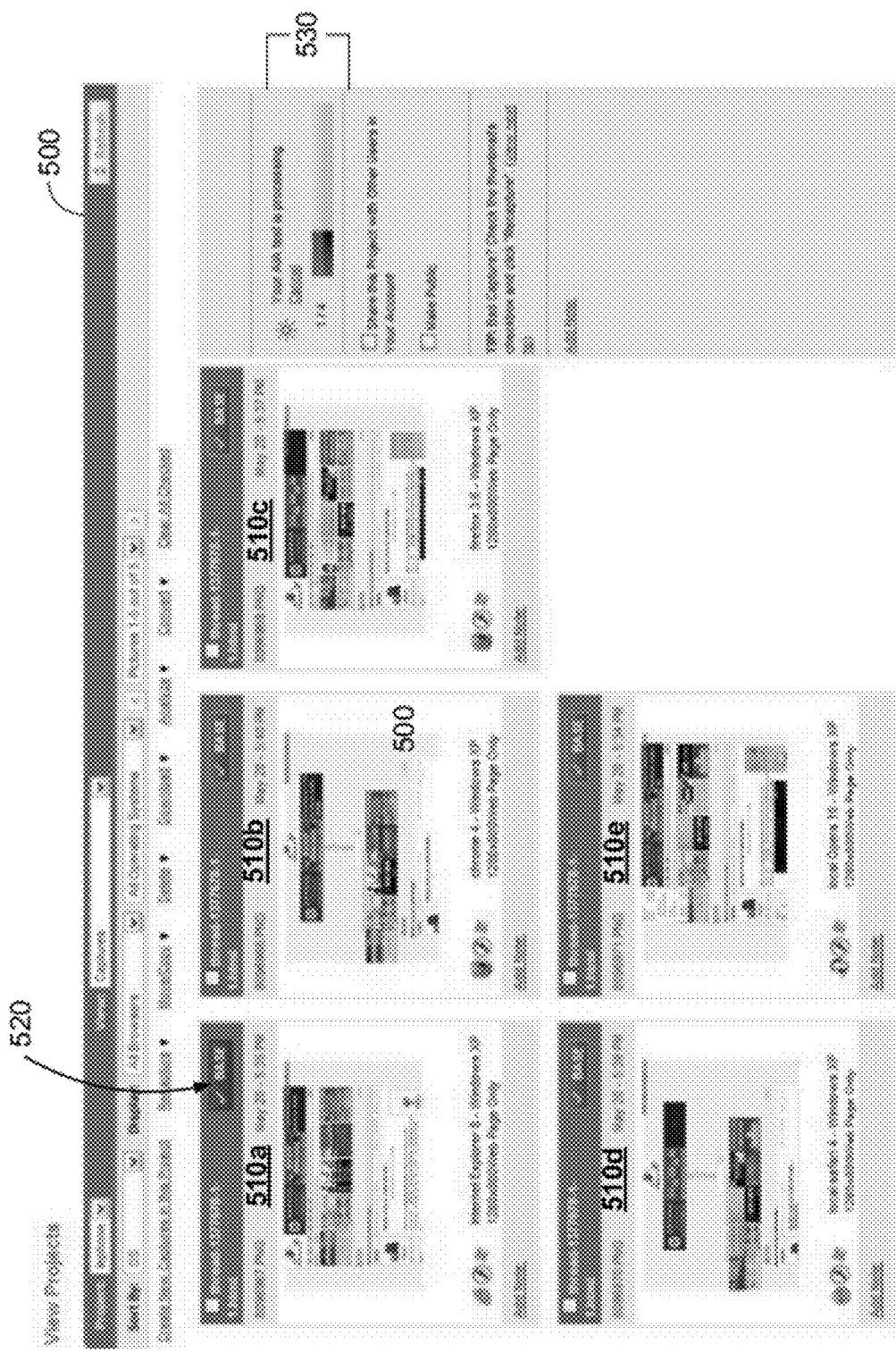
FIG. 5B depicts one embodiment of the user interface of FIG. 5A in which an analysis has begun.

FIG. 5B depicts one embodiment of the user interface 500 of FIG. 5A in which an analysis has begun. Note that base selection button 520 has been selected for image 510a, thereby designating it as the base image and images 510b-e as the analysis images. A progress bar 530 shows the progress of the analysis.

Figure 5C:
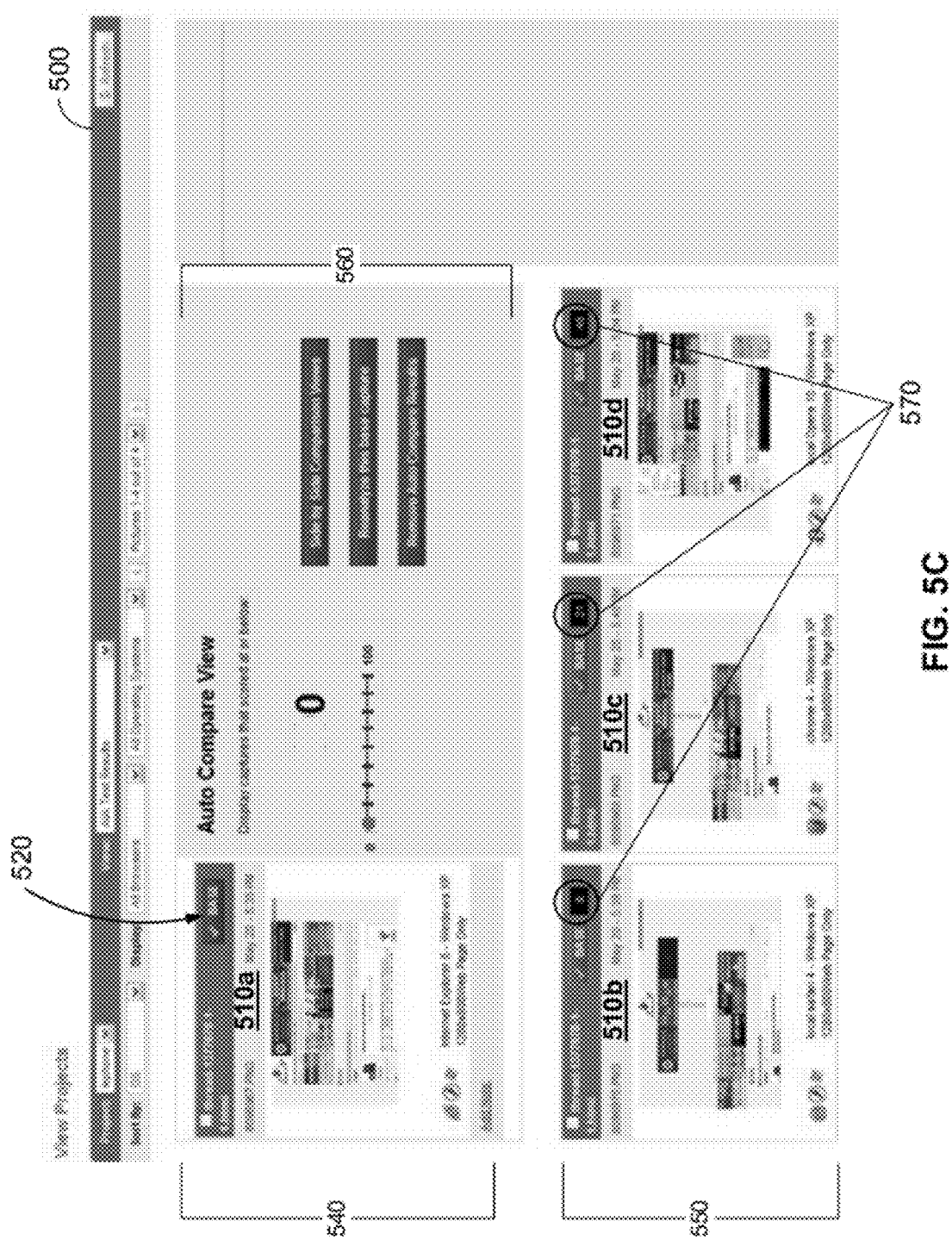
FIG. 5C depicts one embodiment of the user interface of FIG. 5A in which an analysis has completed.

FIG. 5C depicts one embodiment of the user interface 500 of FIG. 5A in which an analysis has completed. The user interface 500 has been separated into three visually distinguished and concurrently displayed areas: a base image display area 540 (showing base image 510a selected 520 for comparison), an analysis image display area 550 (showing analysis images 510 b-d), and a similarity range display area 560 (indicating all images, i.e., those with similarity scores of 0 or more, are displayed). Each analysis image 510b-d now displays an associated similarity score 570.

Figure 5D:
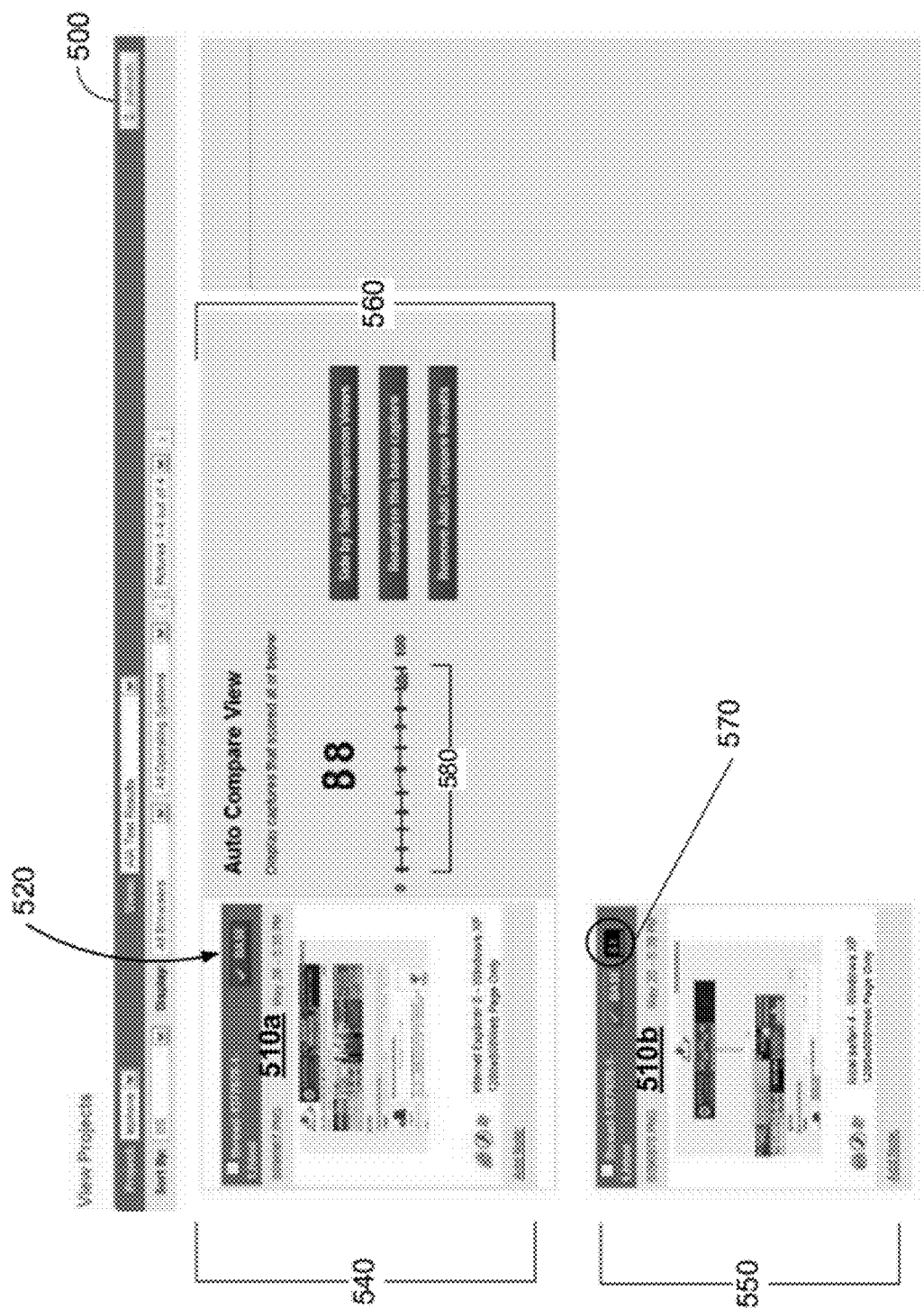
FIG. 5D depicts one embodiment of the user interface of FIG. 5A in which a filter is applied.

FIG. 5D depicts one embodiment of the user interface 500 of FIG. 5A in which a filter is applied. In this depiction, the similarity range display area 560 includes a slider 580 for adjusting a threshold similarity for display of analysis images in the analysis image display area 550. The slider 580 is set to 88 in this example, and thus the analysis images displayed are adjusted; only analysis image 510b, with a similarity score 570 of 88, is shown.

Figure 5E:
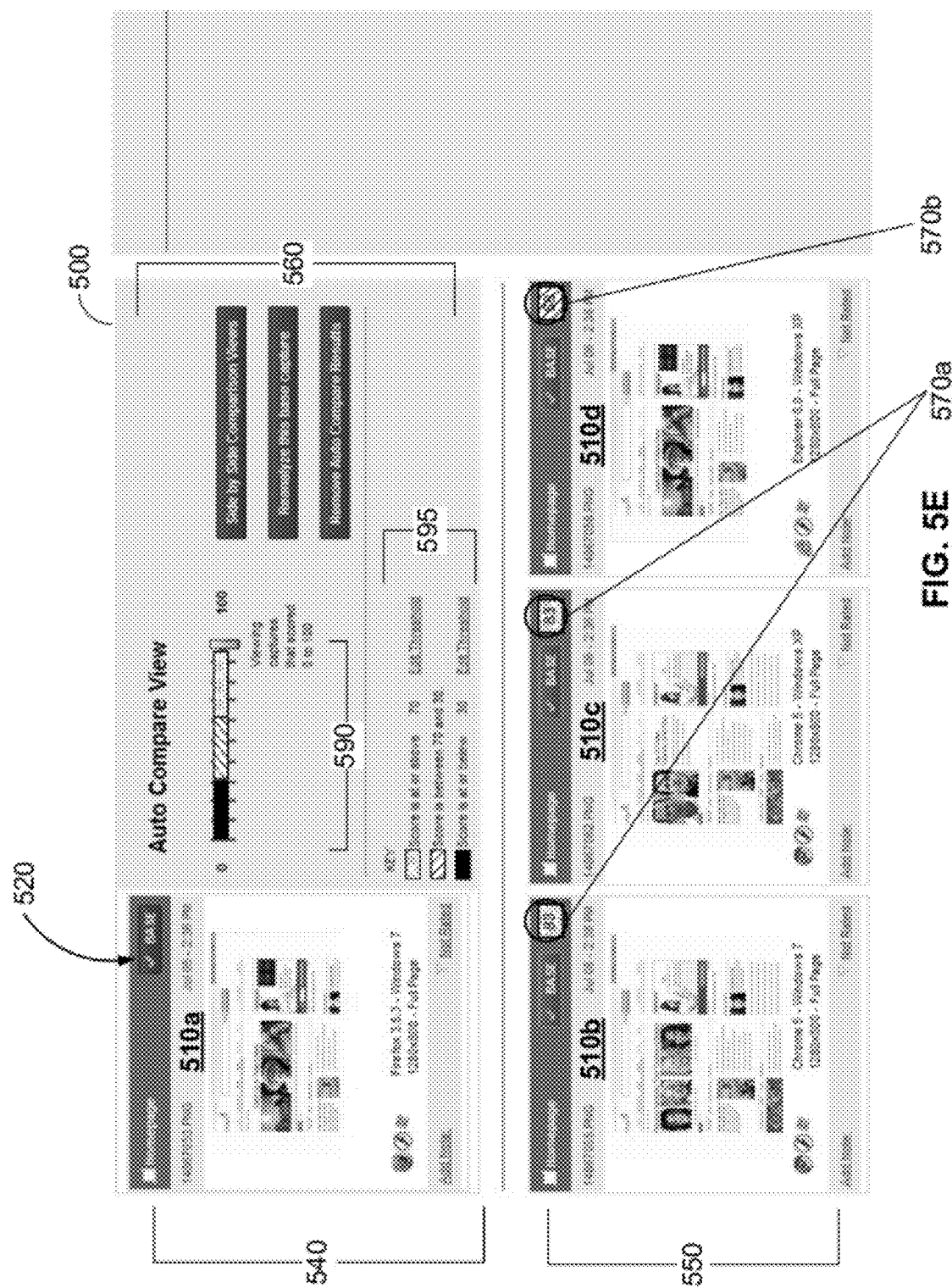
FIG. 5E depicts one embodiment of the user interface of FIG. 5A in showing multiple similarity levels.

FIG. 5E depicts one embodiment of the user interface 500 of FIG. 5A in showing multiple similarity levels. In this depiction, the similarity range display area 560 includes a slider 590 similar to the slider 580 of FIG. 5D, except that it shows various similarity levels. In the depicted example, similarity scores lower than 30 are visually distinguished from scores between 30 and 70 and from similarity scores over 70. A legend area 595 explains what each visually distinguished level pertains to. In this example the levels are shown using solid, hashed, and dotted bars, however, any manner of visually distinguishing the levels can be used, e.g., using various colors. Each of the upper and lower thresholds shown in the legend area 595 can be set independently. In addition, the similarity scores 570 of the analysis images 510b-d are shown in the same visually distinguishable manner as the slider levels (e.g., dotted 570a and hashed 570b).

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method for comparing similarity between images, comprising:
    receiving, at a first computer, a base image and a selected portion of the base image as a basis for image comparison, the base image corresponding to a web page as rendered by a first browser;
    receiving, at the first computer, at least one analysis image, the at least one analysis image corresponding to the web page as rendered by at least a second browser different from the first browser;
    determining a portion of the at least one analysis image corresponding to the selected portion of the base image;
    determining color information for the selected portion of the base image and for the corresponding portion of the at least one analysis image;
    determining a color score by comparing the color information of the selected portion of the base image to the color information of the corresponding portion of the at least one analysis image; and
    determining, at the first computer, a similarity between the base image and the at least one analysis image based on the color score, the similarity reflecting a degree to which the base image and the at least one analysis image are identical.

2. The method of claim 1, wherein the base image and the at least one analysis image correspond to the web page as rendered by different devices.

3. The method of claim 1, further comprising receiving coordinates corresponding to selection of the selected portion.

4. The method of claim 1, wherein the base image is the web page and the selected portion is the entire web page.

5. The method of claim 1, wherein the base image is the web page and the selected portion excludes a section of the web page.

6. The method of claim 1, wherein the at least one analysis image received comprises multiple analysis images, and the color information is compared between the base image and each of the multiple analysis images to determine the similarity between the base image and each of the multiple analysis images.

7. The method of claim 1, wherein determining color information further comprises:
   quantifying a color in the selected portion of the base image; and
   quantifying the color in the corresponding portion of the at least one analysis image;
   wherein comparing color information further comprises comparing the quantified color in the selected portion of the base image to the quantified color in the corresponding portion of the at least one analysis image; and
   wherein determining the similarity between the base image and the at least one analysis image comprises determining a similarity score based on the similarity between the quantified color in the selected portion of the base image and the quantified color in the corresponding portion of the at least one analysis image.

8. The method of claim 7, wherein quantifying the color in the selected portion and in the corresponding portion comprises determining a number of pixels of the color in the selected portion and in the corresponding portion.

9. The method of claim 7, wherein determining the similarity score further comprises:
   determining a portion score for the portion based on the similarity between the quantified color in the selected portion of the base image and the quantified color in the corresponding portion of the at least one analysis image; and
   dividing the portion score by a total size of the selected portion.

10. The method of claim 1, wherein determining the color information further comprises:
    quantifying the color in the selected portion of the base image; and
    quantifying the color in the corresponding portion of the at least one analysis image;
    wherein comparing the color information further comprises:
       taking a first hash of the quantified color in the selected portion of the base image; and
       taking a second hash of the quantified color in the corresponding portion of the at least one analysis image; and
    wherein determining the similarity between the base image and the at least one analysis image further comprises:
       comparing the first and second hashes to determine whether the quantified colors in the selected portion of the base image and the corresponding portion of the at least one analysis image are identical;
       in response to a determination that the quantified colors are identical, assigning a highest similarity score; and
       in response to a determination that the quantified colors are not identical, determining a similarity score for the quantities.

11. The method of claim 1, further comprising storing the similarity between the base image and the at least one analysis image.

12. The method of claim 1, further comprising displaying the similarity between the base image and the at least one analysis image based on the comparison as a similarity score associated with each of the at least one analysis images.

13. The method of claim 12, further comprising:
    displaying a control to select a threshold similarity; and
    updating the displaying to show a subset of the each of the at least one analysis images with scores greater than the threshold similarity.

14. The method of claim 13, wherein the control selects a lower threshold similarity, further comprising:
    displaying a second control to select an upper threshold similarity;
    wherein updating the displaying provides a visual indication of scores above the upper threshold similarity, below the lower threshold similarity, and between the lower and upper threshold similarities.

15. The method of claim 1, wherein determining the similarity between the base image and the at least one analysis image based on the comparison further comprises:
    determining a difference score representing a difference between the color information of the selected portion of the base image to the color information of the corresponding portion of the at least one analysis image; and
    establishing the similarity by assigning the lowest difference score the highest similarity.

16. The method of claim 1, wherein the first browser and the at least second browser render the web page on a single device.

17. A nontransitory computer-readable storage medium having computer program instructions embodied therein for comparing similarity between images, comprising:
    an image module configured for receiving a base image and a selected portion of the base image as a basis for image comparison, and for receiving at least one analysis image and determining a portion of the at least one analysis image corresponding to the selected portion of the base image, the base image corresponding to a web page as rendered by a first browser and the at least one analysis image corresponding to the web page as rendered by at least a second browser different from the first browser;
    a color information module configured for determining color information for the selected portion and for the corresponding portion of the at least one analysis image; and
    a comparison module configured for comparing the color information of the selected portion of the base image to the color information of the corresponding portion of the at least one analysis image to determine a color score and determining a similarity between the base image and the at least one analysis image based on the color score, the similarity reflecting a degree to which the base image and the at least one analysis image are identical.

18. The nontransitory computer-readable storage medium of claim 17, wherein the base image and the at least one analysis image correspond to the web page as rendered by different devices.

19. The nontransitory computer-readable storage medium of claim 17, wherein the base image is a web page and the selected portion excludes a section of the web page.

20. The nontransitory computer-readable storage medium of claim 17, wherein:
  the color information module is further configured for determining a number of pixels of a color in the selected portion of the base image and determining a number of pixels of the color in the corresponding portion of the at least one analysis image;
  wherein the comparison module is further configured for comparing the number of pixels of the color in the selected portion of the base image to the number of pixels of the color in the corresponding portion of the at least one analysis image; and
  further comprising a scoring module configured for determining a similarity score based on the similarity between the number of pixels of the color in the selected portion of the base image and the number of pixels of the color in the corresponding portion of the at least one analysis image.

21. A system for comparing similarity between a selected portion of a base image and a corresponding portion of at least one analysis image, comprising:
  means for determining color information for the selected portion and for the corresponding portion of the at least one analysis image, the base image corresponding to a web page as rendered by a first browser and the at least one analysis image corresponding to the web page as rendered by at least a second browser different from the first browser;
  means for comparing the color information of the selected portion of the base image to the color information of the corresponding portion of the at least one analysis image; and
  means for determining a similarity score between the base image and the at least one analysis image based on the comparing, the similarity score reflecting a degree to which the base image and the at least one analysis image are identical.

22. The system of claim 21, wherein the base image and the at least one analysis image correspond to the web page as rendered by different devices.

23. The system of claim 21, wherein the base image is a web page and the selected portion excludes a section of the web page.

24. The system of claim 21, wherein the color information for the selected portion comprises a number of pixels of the color in the selected portion in the base image and the color information for the corresponding portion comprises a number of pixels of the color in the corresponding portion of the at least one analysis image; and
  wherein the means for determining a similarity score comprises comparing the similarity between the number of pixels of the color in the selected portion of the base image and the number of pixels of the color in the corresponding portion of the at least one analysis image.

25. A nontransitory computer-readable medium storing a computer program executable by a processor, the computer program producing a user interface of an image comparison system, the user interface comprising:
  a base image display area for displaying a base image corresponding to a web page as rendered by a first browser;
  an analysis image display area, visually distinguished from and concurrently displayed with the base image display area, for displaying at least one analysis image and a score associated with each of the at least one analysis images, the at least one analysis image corresponding to the web page as rendered by at least a second browser different from the first browser; and
  a similarity range display area, visually distinguished from and concurrently displayed with the base image and analysis image display areas, for displaying similarity information corresponding to similarity between the base image and the at least one analysis image, the similarity reflecting a degree to which the base image and the at least one analysis image are identical.

26. The nontransitory computer-readable medium of claim 25, wherein the similarity range display area further comprises a similarity scale displaying a control for selection of a threshold similarity for display of the at least one analysis image.

27. The nontransitory computer-readable medium of claim 26, further comprising, in response to input adjusting the control for selection of the threshold similarity, adjusting the at least one analysis images displayed.

28. The nontransitory computer-readable medium of claim 26, wherein the similarity scale displays levels of similarity between the base image and the at least one analysis image.

29. The nontransitory computer-readable medium of claim 25, further comprising a control for designating the base image and for selecting at least one portion of the base image for comparison to the at least one analysis image.

* * * * *